United States Patent
Alfredsson

[11] Patent Number: 6,021,684
[45] Date of Patent: Feb. 8, 2000

[54] MOTOR VEHICLE GEARBOX

[75] Inventor: Sverker Alfredsson, Västra Frölunda, Sweden

[73] Assignee: AB Volvo, Gothenburg, Sweden

[21] Appl. No.: 09/101,727

[22] PCT Filed: Feb. 5, 1997

[86] PCT No.: PCT/SE97/00173

§ 371 Date: Jul. 16, 1998

§ 102(e) Date: Jul. 16, 1998

[87] PCT Pub. No.: WO97/29300

PCT Pub. Date: Aug. 14, 1997

[30] Foreign Application Priority Data

Feb. 8, 1996 [SE] Sweden .................................. 9600464

[51] Int. Cl.[7] .................................................. F16H 3/08
[52] U.S. Cl. .............................................. 74/331; 74/333
[58] Field of Search ...................................... 74/331, 333

[56] References Cited

U.S. PATENT DOCUMENTS

| | | |
|---|---|---|
| 1,756,917 | 4/1930 | Tenney ....................... 74/331 |
| 1,780,460 | 11/1930 | Burnett ....................... 74/333 |
| 2,475,803 | 7/1949 | Probst ........................ 74/333 |
| 2,633,753 | 4/1953 | Campodonico . |
| 4,252,223 | 2/1981 | Morscheck . |
| 4,329,885 | 5/1982 | Morscheck . |

FOREIGN PATENT DOCUMENTS 464347   4/1991   Sweden .

*Primary Examiner*—Dirk Wright
*Attorney, Agent, or Firm*—Young & Thompson

[57] ABSTRACT

Motor vehicle gearbox with alternately driven, double concentric input shafts (6,9), double lay shafts and an output shaft (19). The outer input shaft (9) is mounted in a front end wall (12) of the gearbox housing. The inner input shaft (6) is mounted in the outer shaft and has at its proximal portion a shaft end (17), which extends into a bore (18) in the output shaft and is carried in the bore in two bearings (20,22) spaced from each other.

15 Claims, 1 Drawing Sheet

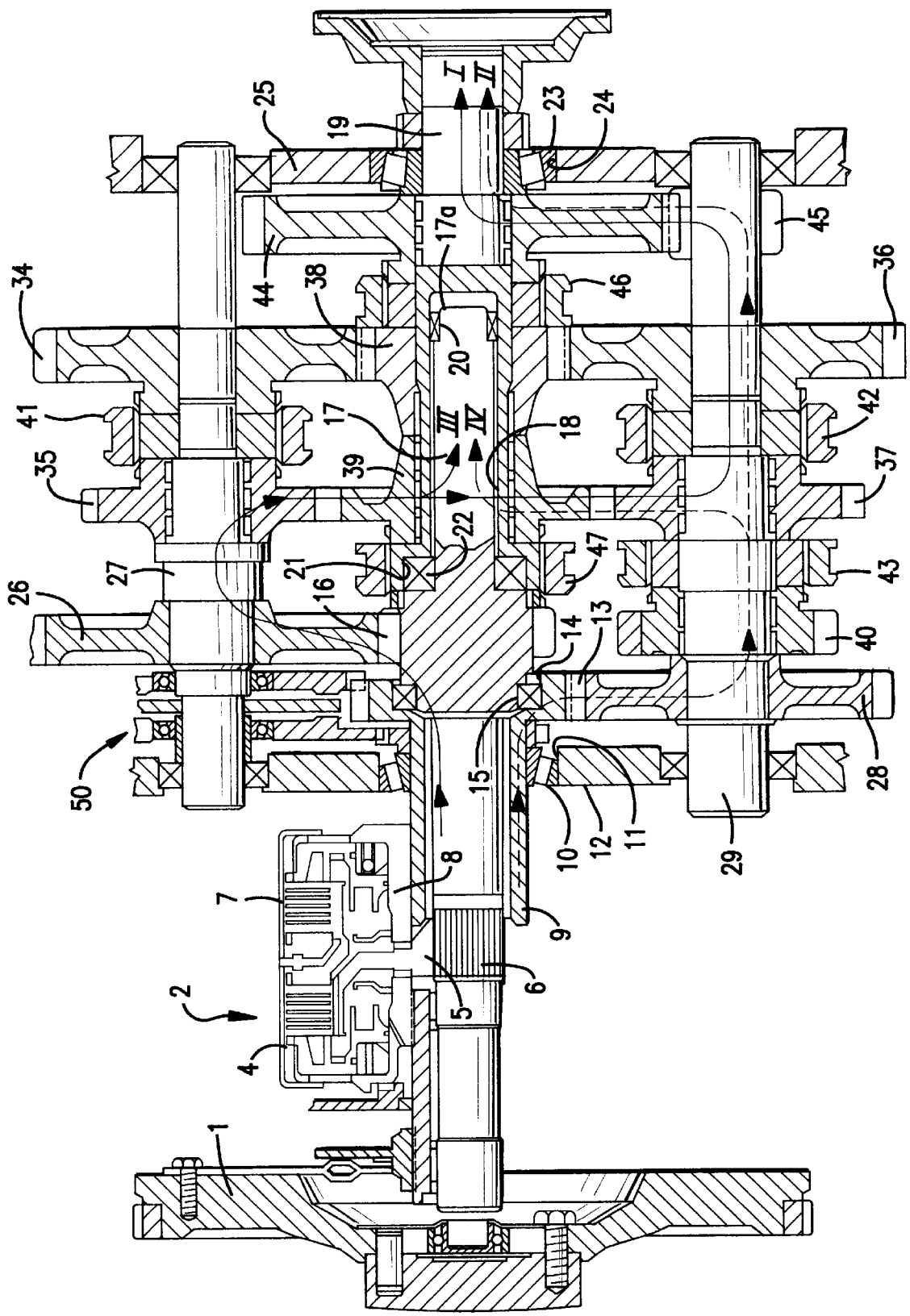

MOTOR VEHICLE GEARBOX

FIELD OF THE INVENTION

The present invention relates to a motor vehicle gearbox, comprising at least one input shaft, at least one lay shaft, gears carried by the input shaft and the lay shaft, said gears engaging each other to transmit torque from the input shaft to the lay shaft, an output shaft and gears which are carried by the lay shaft and the output shaft and which interengage in pairs to transmit torque from the lay shaft to the output shaft, at least one gear in each pair being a releasable free gear, either the input shaft or the output shaft being provided with an axial, cylindrical and concentric bore opening at a shaft end facing the shaft end of the other shaft, said other shaft being provided with a shaft end which extends into and is carried in the bore.

BACKGROUND OF THE INVENTION

SE-8802885-7 describes as previously known a gearbox of this type having two concentrically journaled input shafts, arranged to be driven alternately, and two lay shafts driven by said input shafts and having gears in engagement with gears on an output shaft. The inner input shaft is mounted in a roller bearing which is held in a bearing seat in a wall of the gearbox housing, and is provided with an axial bore into which there extends a shaft end of the output shaft. The proximal end of the shaft end is mounted in a roller bearing mounted in the bore and lies in the same radial plane as the proximal bearing of the input shaft, i.e. in the intermediate wall. The outer input shaft is mounted on the inner input shaft via an intermediate bearing which is disposed on the input side of the gearbox relative to the housing wall. The output shaft is in this manner journaled in the gearbox housing at both ends at the same time as the inner input shaft can be dimensioned with very little inner overhang, which eliminates the risk of excessive deflection of the two shafts.

The disadvantage of the arrangement described is, however, that the housing wall requires a certain amount of axial space making the gearbox longer and heavier than if the housing wall could be eliminated. A further disadvantage is that the lay shaft packages cannot be completely pre-assembled prior to installation in the gearbox housing, since they carry components which are to lie on either side of the housing wall. In this known gearbox, a central synchronization device on one lay shaft lies on the outside of the housing wall, while the rest of the components lie on the inside of the housing wall. On the second lay shaft outside the housing wall, there is a gear engaging a gear of the outer input shaft while the rest of the components lie inside the housing wall.

SUMMARY OF THE INVENTION

The purpose of the present invention is, in a gearbox of the type described by way of introduction to achieve a shaft bearing arrangement which eliminates the need for a housing wall without creating problems with excessive deflection of the input and output shafts.

This is achieved according to the invention by virtue of the fact that said shaft end is carried in the bore at at least two axially spaced bearing points. By bearing one shaft in the other with double bearings, the shafts are relieved of load without having to use an intermediate wall. This in turn means that the length and weight of the gearbox can be reduced and that the lay shaft packages can be pre-assembled completely prior to installation in the gearbox housing.

In a preferred embodiment of a gearbox with double concentric input shafts and double lay shafts, the bore is made in the output shaft and the shaft end portion is made on the inner input shaft. At the opening of the bore therein the output shaft has a bearing seat of greater diameter than the remaining portion of the bore in the output shaft and said seat can hold a bearing of various sizes adapted to the difference in diameter.

The inner input shaft, in front of its gear engaging the associated lay shaft, is mounted in two bearings against the outer input shaft, which in turn is carried in the gearbox housing.

BRIEF DESCRIPTION OF THE DRAWINGS

The invention will be described in more detail below with reference to examples shown in the accompanying drawing, where the FIGURE shows a longitudinal section through a 7-speed motor vehicle gearbox.

DETAILED DESCRIPTION OF THE INVENTION

In the FIGURE, the numeral 1 designates an engine flywheel, which via a multidisc wet disc clutch, generally designated 2, drives a gearbox 3 according to the invention. The clutch 2 is a double clutch of a type known per se and therefore need not be described in more detail here. The lefthand clutch unit 4 as seen in the FIGURE is coupled via a sleeve element 5 to a first input shaft 6 in the gearbox, while the right-hand clutch unit 7 is coupled via a sleeve element 8 to a second input shaft 9 in the form of a hollow shaft mounted concentrically with the first shaft 6. The two clutch units can be alternately engaged and disengaged to alternately drive the input shafts 6 and 9. The wet-disc clutch shown can be replaced by a double dry-disc clutch.

The hollow shaft 9 is mounted in a conical roller bearing, 10 held in a bearing seat 11 in a front end wall 12. The shaft 9 is made with a gear ring 13 surrounding a bearing seat 14 for a bearing 15, in which the first input shaft 6 is carried and which can be a taper roller bearing. The shaft 6 is provided with a gear ring 16 and with a shaft end 17 of reduced diameter relative to the shaft portion surrounded by the gear ring. The shaft end 17 extends into a cylindrical bore 18 in an output shaft 19. The bore 18 extends from the end of the shaft 19 approximately half the length of the output shaft and the shaft end 17 extends almost to the bottom of the bore 18, where, via portion 17a of reduced diameter, it is carried in a bearing 20 which can be a taper roller bearing. The bore 18 at its opening is provided with a bearing seat 21 of greater diameter than the remaining portion of the bore. The bearing seat 21 holds a bearing, 22 which can be a roller bearing and in which the shaft end 17 is mounted. The distal end of the output shaft 19 is born a taper roller bearing 23 mounted in a seat 24 in the rear end 25 of the gearbox housing.

By virtue of the arrangement described with bearings 20,22 placed relatively far from each other, between the input shaft 6 and the output shaft 19 and with a greater inner diameter for bearing 22 than for bearing 20 and a relatively thick shaft end 17, a proximal bearing is provided which prevents deflection of the shafts.

The gear ring 16 of the first input shaft 6 drives a gear 26, which is solidly joined to a first lay shaft 27. The gear ring 13 of the second input shaft 9 drives a gear 28. which is solidly mounted on a second lay shaft 29. The gear ring 13 is greater than the gear ring 16, which means that the second lay shaft 29 will rotate more rapidly than the first lay shaft assuming the same input rpm for the respective input shaft.

The lay shaft 27 is mounted in bearings 30, 31 in the front and rear housing end walls 12 and 25 and supports a pair of freely rotatably mounted gears 34,35. The lay shaft 29 is carried in bearings 32,33 in the front and rear housing end walls 12 and 25 and carries a pair of freely rotatably mounted gears 36,37. The gears 34,36 are in common engagement with a gear 38 solidly mounted on the output shaft 19. The gears 35,37 are in engagement with idle gear 39 mounted on the output shaft and provided with engaging teeth. The shafts are arranged in a V-shape to makes it possible, with an extra gear 40 on the lay shaft 29, said extra gear engaging the gear 26 on the lay shaft 27, to reverse the rotational direction of one of the lay shafts for backing the vehicle. It is also possible to reverse the rotational direction of the respective lay shaft by means of a gear mounted on a separate shaft in the housing, said gear engaging gear rings 16 and 40. This provides a freer choice of V-shape and gear ratios and also makes it possible to place the shafts in the same plane. The gears 34,35,36,37 and 40 can be locked to their shafts with the aid of axially displaceable engaging sleeves 41,42 and 43. A gear 44 freely rotatable on the output shaft 19 engages a gear ring 45 cut directly into the lay shaft 29 and is lockable to the shaft 19 by means of an engaging sleeve 46. By cutting the gear ring 45 directly into the lay shaft 29 and making the gear 44 lockable to the output shaft, the need for needle bearings for the lay shaft gear is eliminated so that it can be made with a very small diameter, which in turn provides a high gear ratio between the lay shaft and the output shaft. With the aid of an engaging sleeve 47, the free running gear 39 can be locked to the output shaft and the input shaft 6 and the output shaft 19 be locked together for direct drive. All of these engaging means are without conventional synchronizing devices.

In the embodiment shown, the engaging sleeves 41,42, 43,47 and 46 are without co-operating, synchronizing, devices. Instead a so-called central synchronization, generally designated 50, is arranged, which is of the type shown and described in SE-A-8700583 and which does not constitute a part of the present invention. For a more detailed description of the shifting pattern when using a central synchronizing device, reference is made to said publication. It is of course to be understood that the gearbox described here and shown in the accompanying drawing could be provided, as an alternative to the central synchronization, with individual synchronizing means of conventional type for each engaging sleeve.

The bearing described between the input shaft 6 and the output shaft 19 eliminates the need for a housing wall between gears and central syncnonization and gears on lay shafts, which makes the gearbox according to the invention easily assembled, short and with small shaft deflections.

I claim:

1. Motor vehicle gearbox, comprising at least one input shaft, at least one lay shaft, gears carried by the input shaft and the lay shaft, said gears engaging each other to transmit torque from the input shaft to the lay shaft, an output shaft and gears which are carried by the lay shaft and the output shaft and which interengage in pairs to transmit torque from the lay shaft to the output shaft, at least one gear in each pair being a releasable free gear, either the input shaft or the output shaft being provided with an axial, cylindrical and concentric bore opening at a shaft end facing the shaft end of the other shaft, said other shaft being provided with a shaft end which extends into and is carried in the bore, wherein the shaft end (17) is carried in the bore (19) at at least two axially spaced bearing locations (20,22), and at least one of said bearing locations (20,22) is located radially inside an engaging sleeve non-rotatably but axially displaceably mounted on the output shaft (19), by means of which a gear (44) is locked to the output shaft (19) or the input and output shafts (6,19) are coupled together to transmit torque directly from the input shaft to the output shaft.

2. Gearbox according to claim 1, wherein the bore (18) is disposed in the output shaft (19), the shaft end (17) is made on the input shaft (6) and the input shaft is carried in an additional bearing (15).

3. Gearbox according to claim 1, wherein the shaft end (17) is mounted in the bore (18) in two spaced roller bearings (20,22).

4. Gearbox according to claim 1, wherein said input shaft (6) is mounted in a surrounding hollow shaft (9), which is mounted in an end wall (12) of the gearbox housing and forms a second input shaft carrying a gear (13) in engagement with a gear (28) on a second lay shaft (29) for transmitting torque from the second input shaft (9) to the second lay shaft, and the second lay shaft (29) and the output shaft (19) carry gears (36,37,38,39), which engage each other in pairs to transmit torque from the second lay shaft to the output shaft and of which at least one gear in each pair is a releasable freely rotating gear.

5. Gearbox according to claim 1, wherein the bore (18) extends approximately half the length of the shaft and the shaft end (17) extends substantially the entire bore.

6. Gearbox according to claim 1, wherein the bore (18) is provided adjacent the opening with a bearing seat (21) of greater diameter than the remaining portion of the bore and has bearings (20,22) of different sizes adapted to the differences in diameter.

7. Gearbox according to claim 2, wherein the shaft end (17) is mounted in the bore (18) in two spaced roller bearings (20,22).

8. Gearbox according to claim 7, wherein said input shaft (6) is mounted in a surrounding hollow shaft (9), which is mounted in an end wall (12) of the gearbox housing and forms a second input shaft carrying a gear (13) in engagement with a gear (28) on a second lay shaft (29) for transmitting torque from the second input shaft (9) to he second lay shaft, and the second lay shaft (29) and the output shaft (19) carrying gears (36,37,38,39), which engage each other in pairs to transmit torque from the second lay shaft to the output shaft and of which at least one gear in each pair is a releasable freely rotating gear.

9. Motor vehicle gearbox, comprising at least one input shaft, at least one lay shaft, gears carried by the input shaft and the lay shaft, said gears engaging each other to transmit torque from the input shaft to the lay shaft, an output shaft and gears which are carried by the lay shaft and the output shaft and which interengage in pairs to transmit torque from the lay shaft to the output shaft, at least one gear in each pair being a releasable free gear, either the input shaft or the output shaft being provided with an axial, cylindrical and concentric bore opening at a shaft end facing the shaft end of the other shaft, said other shaft being provided with a shaft end which extends into and is carried in the bore, wherein the shaft end (17) is carried in the bore (19) at at least two axially spaced bearing locations (20,22);

said input shaft (6) being mounted in a surrounding hollow shaft (9), which is mounted in an end wall (12) of the gearbox housing and forms a second input shaft carrying a gear (13) in engagement with a gear (28) on a second lay shaft (29) for transmitting torque from the second input shaft (9) to the second lay shaft, and the second lay shaft (29) and the output shaft (19) carrying gears (36,37,38,39), which engage each other in pairs to transmit torque from the second lay shaft to the output shaft and of which at least one gear in each pair is a releasable freely rotating gear.

10. Gearbox according to claim 9, wherein the bore (18) is disposed in the output shaft (19), the shaft end (17) is made on the input shaft (6) and the input shaft is carried in an additional bearing (15).

11. Gearbox according to claim 10, wherein at least one of said bearing locations (20,22) is located radially inside an engaging sleeve non-rotatably but axially displaceably mounted on the output shaft (19), by means of which a gear (44) is locked to the output shaft (19) or the input and output shafts (6,19) are coupled together to transmit torque directly from the input shaft to the output shaft.

12. Gearbox according to claim 11, wherein the shaft end (17) is mounted in the bore (18) in two spaced roller bearings (20,22).

13. Gearbox according to claim 9, wherein the shaft end (17) is mounted in the bore (18) in two spaced roller bearings (20,22).

14. Gearbox according to claim 9, wherein the bore (18) extends approximately half the length of the shaft and the shaft end (17) extends substantially the entire bore.

15. Gearbox according to claim 9, wherein the bore (18) is provided adjacent the opening with a bearing seat (21) of greater diameter than the remaining portion of the bore and has bearings (20,22) of different sizes adapted to the differences in diameter.

* * * * *